Figure 1:
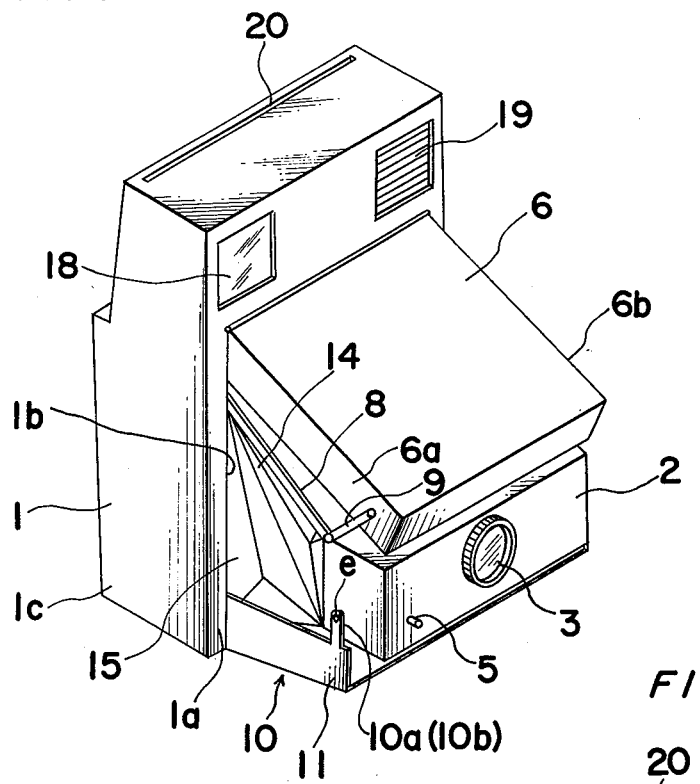

United States Patent [19]

Munakata et al.

[11] 4,074,296
[45] Feb. 14, 1978

[54] FOLDING CAMERA

[75] Inventors: Tsuneaki Munakata, Tokyo; Makoto Kuboshima, Sagamihara, both of Japan

[73] Assignee: Fuji Photo Film Co., Ltd., Minami Ashigara, Japan

[21] Appl. No.: 754,805

[22] Filed: Dec. 27, 1976

[30] Foreign Application Priority Data

Dec. 27, 1975 Japan .................................. 50-157228

[51] Int. Cl.² ............................................. G03B 17/04
[52] U.S. Cl. ..................................................... 354/187
[58] Field of Search .......................... 354/187, 192–194

[56] References Cited

U.S. PATENT DOCUMENTS

| 3,668,991 | 6/1972 | Erlichman | 354/192 X |
| 3,832,726 | 8/1974 | Finelli | 354/187 |
| 3,877,046 | 4/1975 | Sorimachi et al. | 354/187 X |
| 4,006,488 | 2/1977 | Kuboshima | 354/187 |

FOREIGN PATENT DOCUMENTS 2,328,226  12/1974  Germany .............................. 354/192

Primary Examiner—John Gonzales
Attorney, Agent, or Firm—Sughrue, Rothwell, Mion, Zinn and Macpeak

[57] ABSTRACT

Folding camera in which a lens mount carrying a taking lens assembly may be held in a position for taking photographs by linkage assemblies constituted by sides of a case and associated link rods and pivotal support assemblies each constituted by a flat plate connected to the lens mount and a guide rod which connects the plate to the camera and guides movement thereof when the camera is opened or closed. The case constituting part of the linkage assemblies contains flash control elements and forms a front wall portion of the camera when the camera is folded. The pivotal support assembly elements, being flat or narrow, require only minimum accommodation space in the camera, which is therefore rendered compact and easily transportable when folded.

4 Claims, 7 Drawing Figures

FOLDING CAMERA

The present invention relates to a folding camera which is particularly suited for employment as an auto-process camera.

There have recently been proposed various types of so-called auto-process cameras. In such a camera, film material employed is in the form of independent film units rather than in the form of a continuous roll of film, a plurality of film units generally being initially contained in a film unit pack which is loaded in an exposure compartment defined inside the camera, and the camera and/or film unit pack comprising means for pressing the foremost film unit in the pack against a front frame of the pack and in line with exposure openings which are defined in the film unit pack and in the exposure compartment and constitute an exposure station whereat the foremost film unit may be exposed to image-wise light reflected from an external scene and directed into the camera by a taking lens system, and each successive film unit, immediately to being exposed, is moved independently to the exterior of the camera, during which movement developing and processing solution is spread through the film unit by the action of forwarding and processing rolls through which the film unit is passed, whereby there is produced a positive image in the film unit by the so-called diffusion-transfer process and there is obtained a positive print in a very short time. During forwarding of an exposed film unit to the exterior of the camera, a succeeding film unit in the film unit pack is brought to the exposure station, in readiness for production of a subsequent photograph. Generally, an auto-process camera must be larger than a camera employing roll film, since it must be at least large enough to contain sheets of film material equal in size to finished prints. Because of the increased size of auto-process cameras, transport thereof can be inconvenient, and there have accordingly been proposed various types of auto-process camera with a folding-camera construction.

One folding-camera construction proposed for an auto-process camera is a bellows-type construction in which a lens mount carrying a taking lens assembly is movable along a line generally normal to the front wall of the camera to a forward position at which the taking lens assembly is held at a requisite distance from the exposure station to permit production of accurately focussed photographs or to a retracted position in which the front wall of the lens mount is generally level with the front wall of the camera, and a bellows element having a front end attached to the lens mount and a rear end attached to the main body portion of the camera is expanded or folded about a line coinciding with the optical axis of the taking lens assembly as the lens mount is moved to the forward position or to the retracted position. However, use of such a bellows-type construction, which gives a bulkier construction even in conventional roll-film cameras, results in a very unwieldy camera construction when adopted for larger auto-process cameras.

More recently there have been proposed various folding camera constructions for cameras employing positive image type film units. However, the proposed constructions cannot be said to achieve suitable lens-mount retraction constructions permitting requisite compactness of a folded camera.

It is accordingly a main object of the invention to provide a folding camera which has a flatter and more compact outline when in a folded condition.

It is another object of the invention to provide a folding camera requiring only very simple construction elements for moving a lens mount to a forward, photograph-taking position or to a retracted position in which a taking lens assembly carried by the lens mount is protected with the main body portion of the camera.

In accomplishing these and other objects, there is provided according to the present invention a folding-camera wherein a lens mount carrying a taking lens assembly and other exposure control elements is supported on each opposite side thereof by a pivotal support assembly and a linkage assembly, each pivotal support assembly comprising a support plate having one end pivotally connected to the lens mount and the opposite end pivotally connected to one end of a guide rod, whose opposite end is pivotally connected to a fixed portion of the camera interior, and each linkage assembly being in pivotal connection with the lens mount and being constituted by one side of a case, which may contain flash control or other electrical circuit elements, and link rods in pivotal connection with one another and the side of the case. When moved from or to a forward position to or from a retracted position by these assemblies, the lens mount is swung along a circular line centred on the exposure compartment in the camera, and a bellows element provided between the lens mount and the exposure compartment is folded or opened out sideways during this movement. When the camera is in a folded condition the outer wall of the case constitutes a front wall portion of the camera, and the lens mount is enclosed between wall portions of the camera and movable outer cover which is automatically folded over and protects the lens mount. Since the pivotal support assembly is constituted by flat plate and rod elements, it is easily accommodated in slot portions of the camera, which may therefore have a compact and generally flat outline when folded.

Figure 2:
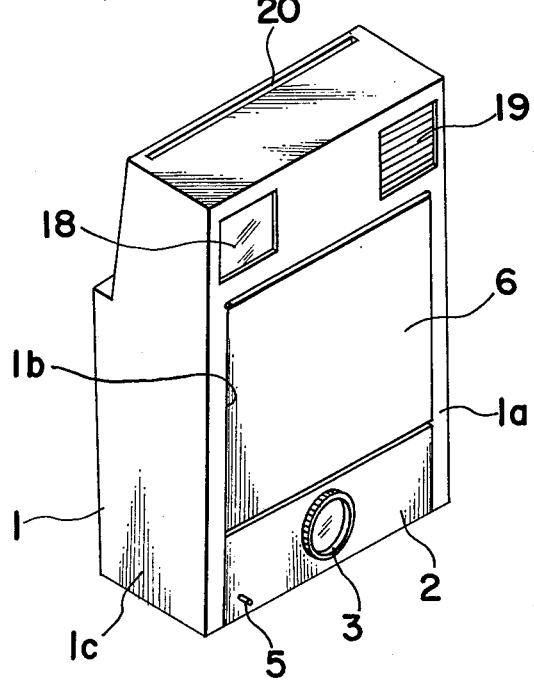
Figure 3:
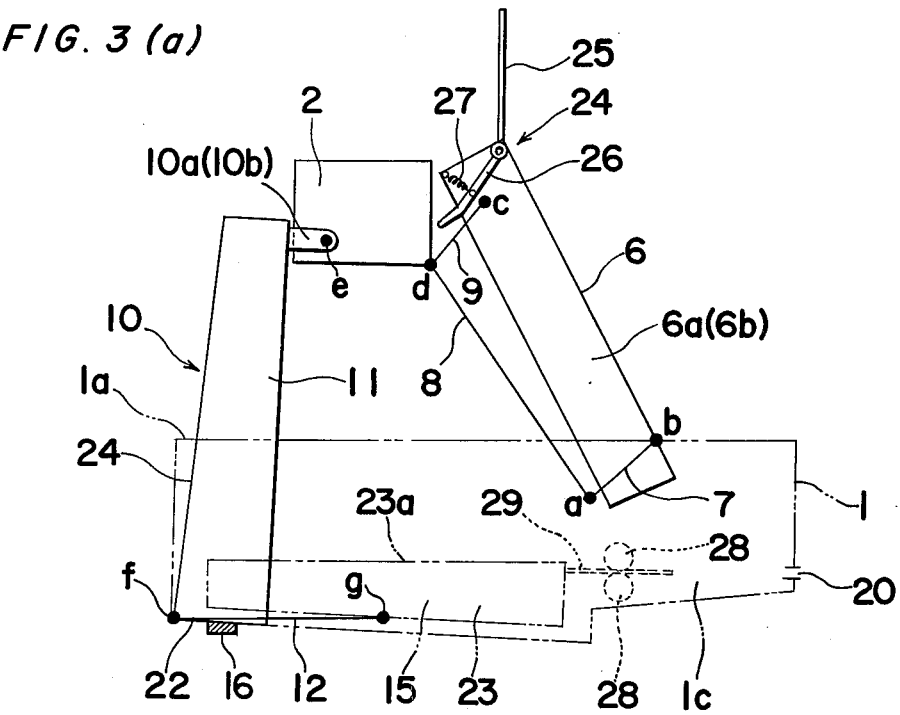
Figure 3:
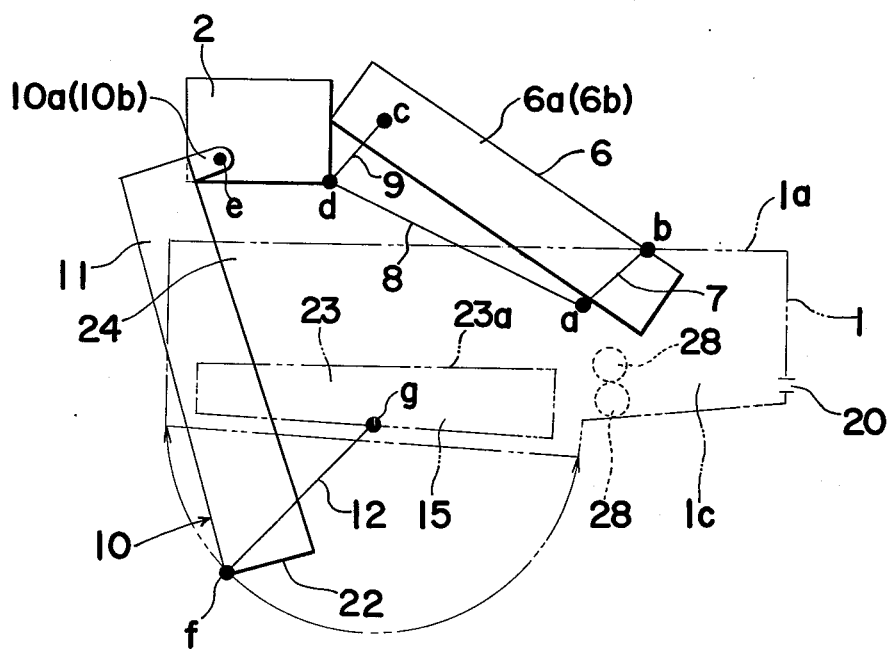
Figure 4:
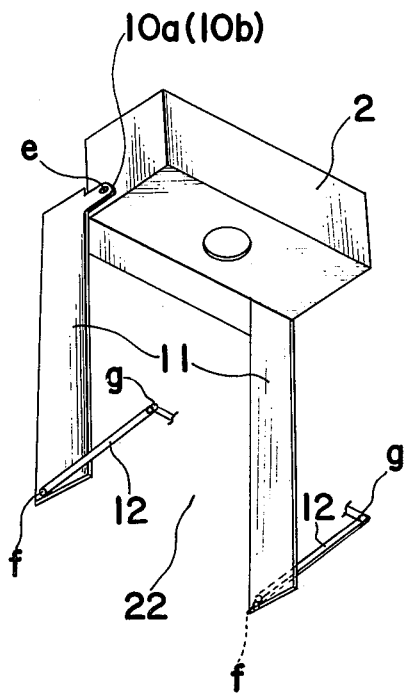
Figure 5:
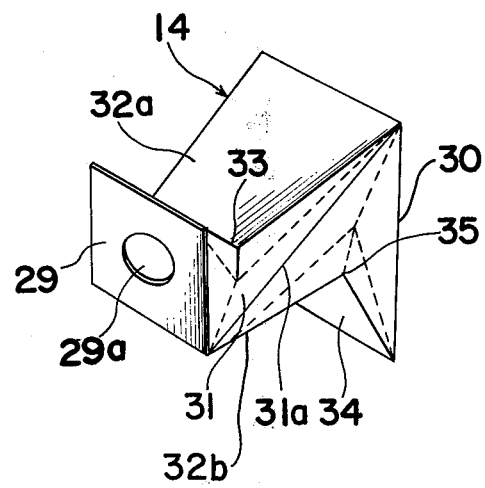

A better understanding of the present invention may be had from the following full description thereof when read in reference to the attached drawings, in which like numbers refer to like parts, and FIG. 1 is a perspective view of a folding camera according to the invention in an opened condition for taking photographs;

FIG. 2 is a perspective view of the camera of the invention in a folded condition;

FIGS. 3(*a*), 3(*b*), and 3(*c*) are schematic cross-sectional views illustrating successive stages of opening or folding of the folding camera according to the invention;

FIG. 4 is a perspective view showing constructional details of a pivotal support assembly employed in the camera of the invention; and FIG. 5 is a perspective view of a side-folding bellows element employed in the camera of the invention.

Before proceeding with the present description it is to be noted that reference to upper or lower portions or front or rear portions of elements of the camera of the invention indicates upper or lower portions thereof which are forwardly or rearwardly located with respect to the main body portion of the camera when the camera is in an opened condition for taking photographs.

Referring to FIGS. 1 and 2, there is shown a folding camera for production of photographs by the diffusion-transfer process which comprises a main body portion 1 in the upper portion of which there is provided a viewfinder 18 and a flash cube 19, and in the top wall of which there is defined an exit slit 20 via which successive exposed and processed film units may be moved to the exterior of the camera. Normally, i.e., when the elements of the camera are disposed to permit photographs to be taken, this being the disposition shown in FIG. 1, a lens mount 2, in which is supported a taking lens assembly 3, and which also carries for example a shutter, shutter-speed and lens-aperture setting means, not shown, and a shutter actuation button 5, or similar known film exposure control means, is held between the outer ends of a case 6 and a pivotal support assemblies 10, each comprising a support plate 11 and a guide rod 12, in a first lens mount position, in which position the lens mount 2 is in a forwardly extending position, clear of the front wall 1a of the camera and the taking lens assembly 3 is held in an attitude permitting photographs to be taken, the pivotal support assemblies providing support to the lower side of the lens mount 2 and the case 6 to the upper side thereof.

Extending between and attached at opposite ends to the lens mount 2 and an exposure compartment 15 constituted in a rear portion of the camera there is an opaque bellows element 14, which, when the lens mount 2 is in the first lens mount position, is extended and defines a central hollow space permitting passage of image-wise light from the lens assembly 3 to the exposure compartment 15, and which, as described in greater detail below, has a construction permitting it to be folded flat when the lens mount 2 is brought to a second lens mount position in which the lens mount 2 is retracted and brought to the camera interior.

As shown in FIG. 2, when the camera is folded, the case 6 is accommodated in an opening 1b defined in the front portion of the camera and the outer wall thereof is level with the front wall 1a of the camera, and the lens mount 2 is accommodated in the lower portion of the front opening 1b, the front wall of the lens mount 2 being generally level with the camera front wall 1a and the outer wall of the case 6. In this condition of the camera, the front wall of the lens mount 2 is suitably protected by an outer cover 25, which is not shown in FIG. 2, but is described in detail below.

Referring to FIG. 38(a), a film unit pack 23 loaded in the exposure compartment 15 defines a front opening 23a which together with a corresponding opening defined in the front wall of the exposure compartment constitutes an exposure station whereat a foremost film unit in the pack 23 may be exposed to image-wise light reflected from an external scene, the lens assembly 3 being brought into front-to-rear line with the exposure station, i.e., into an attitude in which the optical axis thereof is generally normal to the plane of the exposure station, when the lens mount 2 is held at the first mount position. Subsequent to exposure thereof, successive film units are moved out of the film unit pack 23 and are processed and simultaneously forwarded via the exit slit 20 to the exterior of the camera by processing and forwarding rolls 28 provided in the camera interior above the film unit pack 23.

When film units employed in the camera are film units which are initially provided with processing solution pods, the leading end of each film unit, i.e., the end thereof which leads when the film unit is forwarded out of the camera, is somewhat thicker than the remainder thereof, and the end of the film unit pack 23 which contains the leading ends of the film units, in the example shown in the drawings the upper end of the pack 23, must be made thicker than the remaining portion thereof, and the exposure compartment 15 in which the pack 23 is loaded must be correspondingly shaped. On the other hand, it is required that the plane of the exposure station constituted at the front of the pack 23 and compartment 15 be generally parallel to the plane of the front wall 1a of the camera. In order to define the compartment 15 in a requisite manner for accommodation of the pack 23, therefore, the rear wall of the camera is not parallel to the front wall 1a but is inclined rearwardly with respect thereto and at the level of the upper end of the compartment 15 is joined by a step wall portion 1c to the rear wall upper portion, which may be generally parallel to the front wall 1a.

Referring to FIG. 1 and FIG. 3(a), the case 6 has the general contour of a flat, rectangular box, contains therein a flash circuit, batteries, and similar lighting control elements for actuation of the flash cube 19, and normally extends forwardly and downwardly from the upper portion of the front of the camera main body portion 1. A rear end portion of the outer wall of the case 6 is pivotally mounted on a fixed shaft b which extends between opposite side wall portions of the front opening 1b, the rearmost end portion of the case 6 being inside the opening 1b. The left-to-right dimension of the case 6 is slightly less than that of the lens mount 2 and also slightly less than that of the opening 1b, which permits the case 6 and lens mount 2 to be fitted therein, in a manner described in greater detail below.

Each end of the shaft b is connected by a short link rod 7 to a fixed link pin a which is located rearwardly and downwardly of the shaft b. Each link rod 7 is freely pivotal both about the shaft b and about the corresponding link pin a. Each link pin a is further connected by a long link rod 8, which extends in a line very approximately parallel to the long axis of the side of the case 6, to a link pin constituted by one end of a shaft d' which is fixedly mounted on the upper rear corner portion of the lens mount 2 and extends the entire width of and to slightly beyond the side edges of the lens mount 2. Each link rod 8 is freely pivotal about the corresponding link pins a and d. Each link pin d is further connected by a short link rod 9 to a link pin c which is fixedly attached to a forward end portion of a side wall, 6a or 6b, of the case 6, the link pins c and d permitting free pivotal movement of each link rod 9. Thus, on each side of the case 6 there is in effect constituted a linkage assembly consisting of link rods 7, 8, and 9 and one side, 6a or 6b, of the case 6. As shown most clearly in FIG. 3(a), when the camera is in the opened condition, the front end portion of the case 6 stands clear of the upper wall of the lens mount 2, which is only in indirect connection to the case 6 through the pins d and link rods 8 and 9.

Referring more particularly to FIG. 3(a), fixedly attached to the upper forward corner portion of the case 6 there is a shaft 24 on which is pivotally mounted the rear end portion of the abovementioned outer cover 25, which has dimensions generally equal to those of the front wall of the lens mount 2. Levers 26, which are inclined at an obtuse angle to the plane of the cover 25, are fixedly or integrally attached to the left and right sides of the rear edge of the cover 25. Each lever 26 lies against and has a length greater than the width of the corresponding side wall 6a or 6b of the case 6 and has fixedly attached to a generally central portion thereof one end of a compression spring 27 whose opposite end being fixedly attached to a lower front corner portion of the corresponding side wall of the case 6. When the camera is in the opened condition, the springs 27, which act to pivot the cover 25 and levers 26 clockwise about the shaft 24 as seen in the drawing, cause the cover 25 and levers 26 to pivot to positions in which the cover 25 extends forwardly from the front end of the case 6, along a line which is generally normal to the plane of the camera frontwall 1a, and the levers 26 extend rearwardly, the outer end portion of each lever 26 extending to below the case 6 and the outer tip end thereof being close to but not in actual contact with the upper wall of the lens mount 2. The stopping positions of the cover 25 and levers 26 when the camera is opened may be determined by the dimensions of the springs 27, or there may be provided stop studs which are affixed to the forward end portions of the side walls of the case 6 and are contacted by the levers 27 after a certain amount of clockwise movement of the levers 27.

Referring to FIG. 3(a) and FIG. 4, there is provided a pivotal support assembly on each side of the lens mount 2, and each assembly 10 comprises a long, generally rectangular support plate 11 and a guide rod 12, whose main function is to guide the plate 11 into required positions. The plates 11 are disposed parallel to one another and to the plane of either side of the lens mount 2. The sum of the front-to-rear dimension of the lens mount 2 and the width of the forward end portion of either plate 11 is equal to or slightly less than the front-to-rear dimension of the lower portion of the camera. At the outer end of each support plate 11 there is an integrally attached, short projection 10a, which extends at approximately right-angles from the upper edge of the main portion of the plate 11, and whose outer end is in pivotal attachment to a fixed pin e which is attached to a lower portion of a side wall of the lens mount 2 near the rear wall of the lens mount 2. At the lower corner portion of the inner end of each support plate 11 there is fixedly attached a pivot pin f. Each guide rod 12 has one end in pivotal attachment to the pivot pin f affixed to the corresponding support plate 11 and the opposite end in pivotal attachment to a pivot pin g which is fixedly attached to a side wall portion of the camera main body portion, at a point thereof which is near to the rear wall of the camera, and which in terms of the top-to-bottom dimension of the camera is at or somewhat below the centre of the camera. When the camera is opened, the case 6 is inclined downwardly and forwardly from an upper portion of the camera as noted above, the guide rods 12 extend downwards in a generally vertical alignment from their respective pivot pins g, and the support plates 11 extend forwardly from the front of the camera main body portion 1 and are disposed generally at right-angles to their respective guide rods 12, each support plate 11 being held in this disposition by lock means provided on a lower portion of the rear wall of the camera. The lock means 16 may be constituted by separate elements, one in association with each support plate 11, or, in order to facilitate the action of locking and unlocking, may be constituted by a single element which extends across the camera rear wall and may simultaneously engage or release both support plates 11.

When the case 6 and pivotal support assemblies are in this opened disposition, the lens mount 2 is held in a position which is determined by the relative dimensions of the pivotal support assemblies 10 and the linkage assemblies constituted by the opposite sides 6a and 6b of the case 6 and associated link rods 7, 8, and 9, and is such that the lens assembly 3 carried thereby is correctly aligned with the exposure station defined in the camera and is at a requisite distance therefrom. Since the pivotal support assemblies 10 are prevented from moving by the lock means 16 at this time, the assemblies 10 constitute a rigid support holding the lens mount 2 in a required position, and there is therefore no need for provision of lock means in association with the case 6, which is held in position since the lens mount 2 is a rigid element. Although the lens mount 2 is in principle pivotal about axes passing through the shaft d and pivot pins e, the locations of the pins e are fixed when the camera is opened, because the support plates 11 are fixed by the lock means 16 and the shaft d is therefore brought to a set location determined by the relative dimensions of the lens mount 2 and the linkage assemblies on either side of the case 6, and in practice it is found that by locating the shaft d and pivot pins e more or less in vertical line with one another along the rear edge portion of the lens mount 2, movement of the lens mount 2 from a required attitude is effectively prevented. Needless to say, however, to further ensure rigid positioning of the lens mount 2 there may be provided lock means which lock the lens mount 2 to the projections 10a of the support plates 11.

If the camera is temporarily not required for taking photographs, the lock means 16 is released and manual pressure is applied on the outer surface of the case 6. This causes the case 6 to pivot about the shaft b and pivot pins a, anticlockwise as seen in the drawing, during which movement, as illustrated in FIG. 3(b), the case 6, acting through the shaft d, causes the lens mount 2 to move downwards and rearwards along a circular path, the lens mount 2, acting through the pivot pins e, pushes the outer ends of the support plates 11 downwards and rearwards, and the rear end portions of the support plates 11 move in circular motion along a path determined by the guide rods 12, which are now constrained to pivot anticlockwise about the pivot pins g. To permit this movement of the support plates 11 and pivot rods 12 there are suitably defined in outer wall portions at the lower end portion of the camera slots through which the plates 11 and rods 12 may slide, the exposure compartment 15 of course being constituted by integral opaque wall portions in the interior of the camera.

Figure 3C:
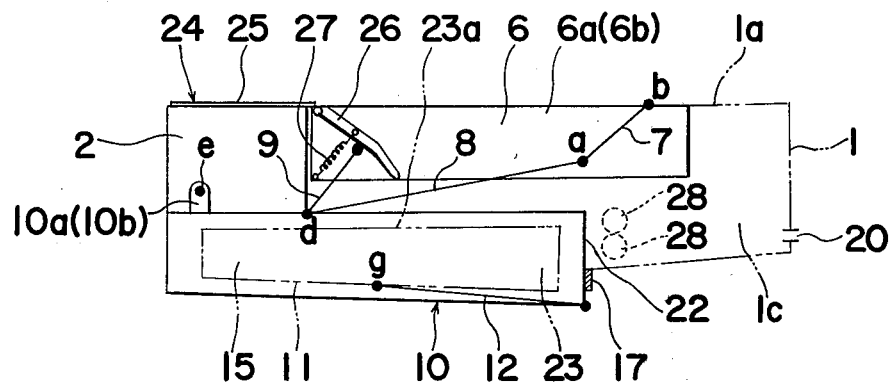

As pressure continues to be applied on the outer wall of the case 6, pivotal and circular movement of the camera elements continue until, as shown in FIG. 3(c), the guide rods 12 are inclined upwardly from their respective pivot pins g, the support plates 11 lie flat against the side walls of the camera, on opposite sides of the exposure compartment 15, the lens mount 2 is accommodated in the lower portion of the front opening 1b, the rear wall of the lens mount 2 being adjacent to the edges of the support plates 11 and the front wall thereof being level with or slightly rearwards of the plane of the camera front wall 1a, and the case 6 also is contained in the front opening 1b, with the outer wall thereof level with the camera front wall 1a. The various elements are held in this folded condition by lock means 17 which is provided on the step wall portion 1c of the camera rear wall and holds the plates 11 in flat alignment against the camera side walls. The lock means 17 is suitably of a type which locks automatically as the plates 11 are brought into this alignment.

During the closing movement shown in FIGS. 3(b) and 3(c), the tip ends of the levers 26 attached to the outer cover 25 are brought into contact with fixed inner wall portions of the camera, with the result that the levers 26 and cover 25 are compelled to pivot anticlockwise, against the force of the springs 27, which are expanded, until, when the camera elements are in the folded condition shown in FIG. 3(c), the cover 25 lies across the front wall of the lens mount 2 and so protects the lens assembly 3 and other externally contactable elements carried by the lens mount 2. The side of the cover 25 which is closest to the lens mount front wall may define concave portions corresponding to projecting elements carried by the mount 2, or may be lined with sponge-like material.

To open the camera, first the lock means 17 is released, which action, it will be noted, may be easily effected because of the location of the lock means 17. When this is done, the springs 27 connecting to the levers 26 cause the case 6 to be moved a slight distance out of the front opening 1b, after which the case 6 is pulled outwards by the photographer until the camera elements are again brought to the disposition shown in FIG. 3(a) and are held therein by the lock means 16, which also is suitably of a type which locks automatically when the support plates 11 are brought to the required open position.

Thus, the invention provides a folding camera in which elements for holding a lens mount in a required position for taking photographs or for moving the lens mount to a retracted position are very simple in construction and require very little accommodation space in the camera, which, when folded, may therefore have a much more compact contour permitting easy transport thereof.

Reference is now had to FIG. 5, which shows an example of construction of the bellows 14 employed in the camera of the invention. The bellows 14 comprises a front frame 29 which is fixedly attached to the rear wall of the lens mount 2 and in which there is defined a circular opening 29a which is at least equal in diameter to the lens assembly 3 and is located in line with the assembly 3, and a rear frame 30 which is somewhat larger than the front frame 29, is fixedly attached to the front wall of the exposure compartment 15, and defines an opening which is in line with and is at least equal in size to the front opening 23a in the film unit pack 23 and corresponding opening in the front wall of the exposure compartment 15. An integrally attached top wall 32a extends from the upper edge portion of the front frame 29 to the upper edge of the rear frame 30. In the front edge portion of the top wall 32a there is defined a fold-in line portion 33 which is parallel to the front edge of the top wall 32a and permits the front frame 29 to be folded back on the top wall 32a, leftwards as seen in FIG. 5, when the camera is folded. The bottom edge of the front frame 29 is connected to the bottom edge of the rear frame 30 by a bottom wall 32b and a base wall portion 34. The bottom wall 32b has a front edge integrally attached to the bottom edge of the front frame 29, extends rearwardly from the front frame 29 along a plane which is approximately normal to the plane of the front frame 29, and has a rear edge integrally attached to the forward edge of the base wall portion 34, which extends rearwardly and downwardly from the bottom wall 32b and has a rear edge fixedly attached to the bottom edge of the rear frame 30. The junction of the bottom wall 32b and base wall portion 34 defines a fold-in line portion 35 which permits the bottom wall 32b to be folded onto the base wall portion 34.

The remainder of the bellows 14 is constituted by integrally attached side walls 31 which, on each side of the bellows 14, extend between the top wall 32a, bottom wall 32b, base wall portion 34, and side edges of the front frame 29 and rear frame 30. In each side wall 31 there is defined a fold-out line portion 31a, which extends diagonally from the junction thereof with the lower corner of the front frame 29 to the junction thereof with the upper corner of the rear frame 30. In each half into which a side wall 31 is divided by the fold-out line portion 31a there are defined fold-in line portions which extend radially from a generally central point of each half so defined to the junctions of the side wall 31 with the corner portions of the front frame 29 and rear frame 30 and with the fold-in line portion 35. Within the areas defined by these fold-in line portions there may be further defined subsidiary fold-in or fold-out line portions.

Thus, when the camera is open, the bellows 14 is extended, as shown in FIG. 5, has a generally rectangular cross-section, and permits unhindered passage of light from the taking lens assembly 3 to a film unit at the exposure station. When the camera is folded, the front frame 29 of the bellows 14 folds back onto the top wall 32a, the side walls 31 fold out along the fold-out line portions 31a, intermediate portions of the side walls 31 are folded between the upper wall 32a or bottom wall 32b and the outwardly folded portions of the side walls 31, and the rear portion of the bellows 14 is folded onto the base wall portion 34, which is simultaneously folded flat against the rear frame 30. When the camera elements are brought to the disposition shown in FIG. 3(c), the bellows 14 is folded generally flat and lies in a small space defined in the front opening 1b between the case 6 and exposure compartment 15.

Although the present invention has fully been described in conjunction with the preferred embodiments thereof with reference to the accompanying drawings, it is to be noted that various changes and modifications are apparent to those skilled in the art. Accordingly, such changes and modifications are to be understood as included within the true scope of the present invention unless they depart therefrom.

What is claimed is:

1. Folding camera comprising at least
   an exposure compartment comprising opaque wall portions and defining an exposure station whereat film material may be exposed;
   a lens mount carrying at least a taking lens assembly able to focus image-wise light reflected from an external scene onto said film material, and having a first support shaft affixed to a first rear corner portion thereof and a second support shaft affixed to a second rear corner portion thereof;
   a front opening defined in a forward portion of said camera;
   a case which has one end pivotally supported in one end portion of said front opening, may be accommodated in said front opening, and may be moved to a first position in which said case extends forwardly from said front opening and to a second position in which said case is accommodated in said front opening;
   linkage assemblies which connect opposite sides of said case to opposite ends of said second support shaft;
   pivotal support assemblies which are provided in connection to opposite sides of said lens mount and each of which comprises a long, generally rectangular support plate whose outer end is in pivotal attachment to a side portion of said lens mount, and a guide rod which has one end in pivotal attachment to the inner end of said support plate and whose opposite end is in pivotal attachment to a portion of a side wall of said camera which is near to the rear wall of said camera and which in terms of top-to-bottom dimension of said camera is in a generally central portion of said side wall;

wall portions defining slots through which said support plates and said guide rods may move or be accommodated; and side-folding opaque bellows element provided between said exposure station and said lens mount.

2. Folding camera as claimed in claim 1, which further comprises a lens mount cover means, which is pivotally mounted on a forward end portion of said case, and cover positioning means which holds said cover in a forwardly extended position and out of contact with said lens mount when said case is in said first position, and causes said cover to be laid over the front wall of said lens mount when said case is in said second position.

3. Folding camera as claimed in claim 2, wherein said cover positioning means comprises levers connecting to said cover and spring elements connecting to said levers and exerting thereon a constant force to cause said levers to move said cover to said forwardly extended position, said levers being uncontacted by other camera elements when said case is in said first position, and being brought into contact with side wall portions of said front opening which cause said levers to be moved counter to the force of said spring elements and move said cover into contact with the front wall of said lens mount when said case is brought to said second position.

4. Folding camera as claimed in claim 1, wherein said case contains electrical circuit elements for control of a photographic flash system.

* * * * *